US012037998B2

(12) United States Patent
Hansmann

(10) Patent No.: US 12,037,998 B2
(45) Date of Patent: Jul. 16, 2024

(54) PUMP SYSTEM, USE OF A PNEUMATIC RESISTANCE AND MEDICAL DEVICE OR GAS-MEASURING DEVICE

(71) Applicant: Dräger Safety AG & Co. KGaA, Lübeck (DE)

(72) Inventor: Hans-Ullrich Hansmann, Barnitz (DE)

(73) Assignee: DRÄGER SAFETY AG & CO. KGAA, Lübeck, NY (US)

( * ) Notice: Subject to any disclaimer, the term of this patent is extended or adjusted under 35 U.S.C. 154(b) by 0 days.

(21) Appl. No.: 18/180,330

(22) Filed: Mar. 8, 2023

(65) Prior Publication Data

US 2023/0220845 A1 Jul. 13, 2023

Related U.S. Application Data

(62) Division of application No. 15/386,464, filed on Dec. 21, 2016, now Pat. No. 11,680,562.

(30) Foreign Application Priority Data

Dec. 23, 2015 (DE) ..................... 10 2015 016 826.6

(51) Int. Cl.

| | |
|---|---|
| ***F04B 49/24*** | (2006.01) |
| ***A62B 18/00*** | (2006.01) |
| ***F04B 39/00*** | (2006.01) |
| ***F04B 39/10*** | (2006.01) |
| ***F04B 41/06*** | (2006.01) |
| ***F04B 43/00*** | (2006.01) |
| ***F04B 43/113*** | (2006.01) |
| ***F04B 49/035*** | (2006.01) |
| ***F04B 49/12*** | (2006.01) |
| ***F04B 49/22*** | (2006.01) |

(Continued)

(52) U.S. Cl.

CPC .......... *F04B 49/24* (2013.01); *F04B 39/0055* (2013.01); *F04B 39/0061* (2013.01); *F04B 39/10* (2013.01); *F04B 43/0072* (2013.01); *F04B 43/1133* (2013.01); *F04B 49/035* (2013.01); *F04B 49/22* (2013.01); *F04B 53/22* (2013.01); *F04C 28/26* (2013.01); *A62B 18/003* (2013.01); *A62B 18/006* (2013.01); *F04B 39/0005* (2013.01); *F04B 41/06* (2013.01); *F04B 49/12* (2013.01); *F04B 2205/15* (2013.01); *F04D 29/601* (2013.01)

(58) Field of Classification Search

CPC .. F04B 49/24; F04B 39/0055; F04B 39/0061; F04B 39/10; F04B 43/0072; F04B 43/1133; F04B 49/035; F04B 49/22; F04B 53/22; F04B 2205/15; F04C 28/26

See application file for complete search history.

(56) References Cited

U.S. PATENT DOCUMENTS 6,408,832 B1 * 6/2002 Christiansen ........ F02M 69/044
417/406

* cited by examiner

*Primary Examiner* — Peter J Bertheaud
(74) *Attorney, Agent, or Firm* — McGlew and Tuttle, P.C.

(57) ABSTRACT

A pump system (120) has a central pump unit (110), with which at least one hook-up unit (130). The at least one hook-up unit (130) is from a group of a plurality of hook-up units (130) that can be combined in modular form for setting an operating point of a pump (10) that forms the pump unit (110). A method uses such a hook-up unit (130) in a pump system (120) for setting an operating point of the pump unit (110) thereof. A medical device is provided with such a pump unit (110) or with such a pump unit (110) and at least one hook-up unit (130) combined with the pump unit (110).

20 Claims, 12 Drawing Sheets

(51) Int. Cl.

| | |
|---|---|
| ***F04B 53/22*** | (2006.01) |
| ***F04C 28/26*** | (2006.01) |
| ***F04D 29/60*** | (2006.01) |

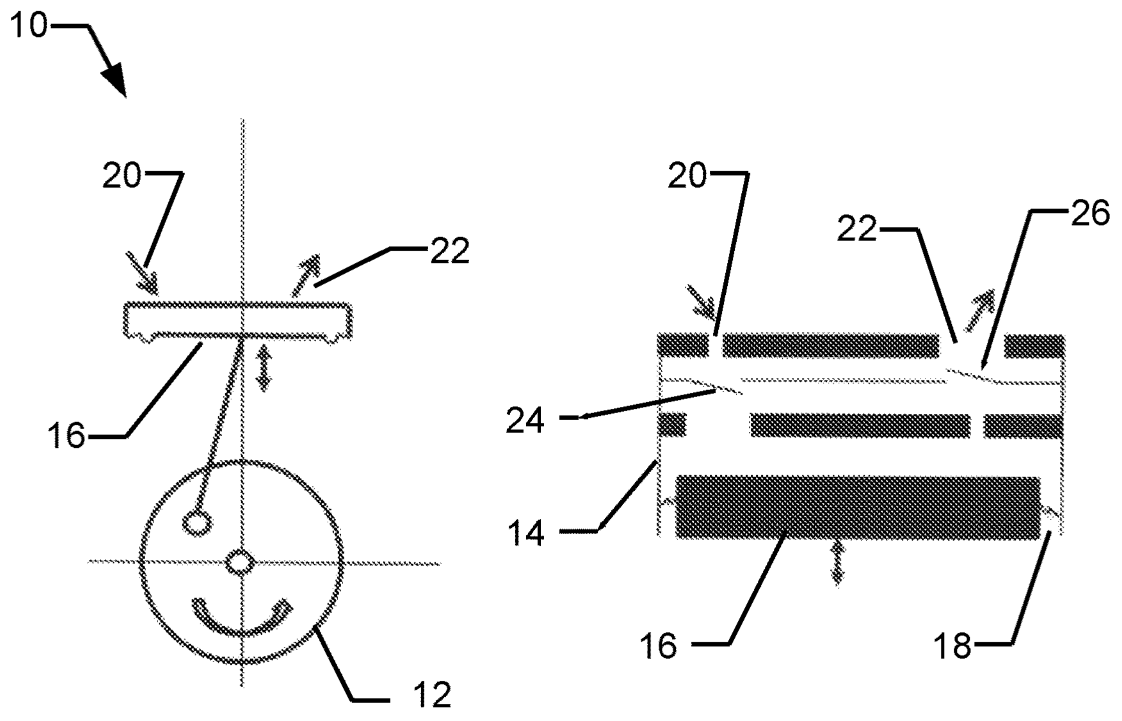
Fig. 1 (State of the Art)
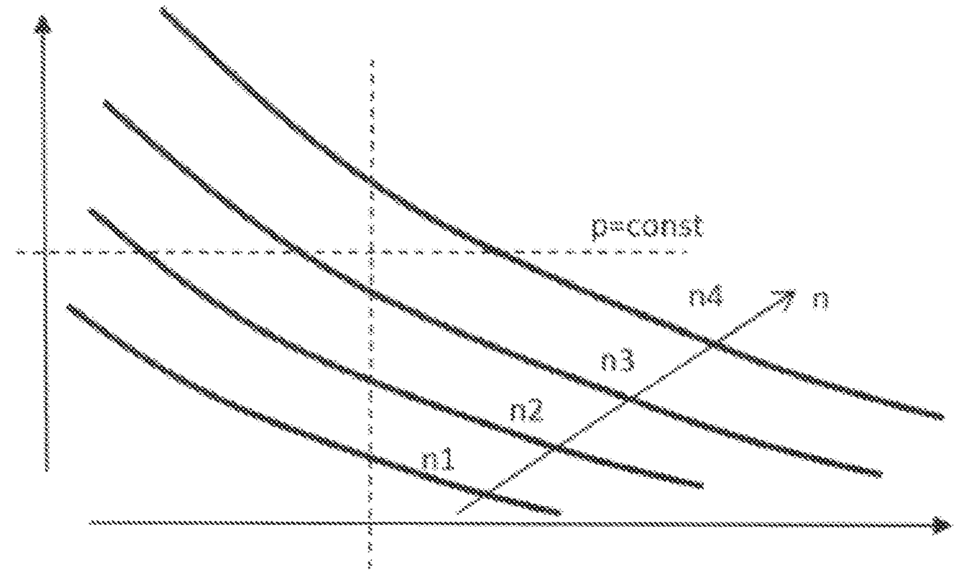
Fig. 2

PUMP SYSTEM, USE OF A PNEUMATIC RESISTANCE AND MEDICAL DEVICE OR GAS-MEASURING DEVICE

CROSS REFERENCE TO RELATED APPLICATIONS

This application is a divisional of, and claims the benefit of priority under 35 U.S.C. § 120 of, U.S. application Ser. No. 15/386,464 filed Dec. 21, 2016, which claims the benefit of priority under 35 U.S.C. § 119 of German Application 10 2015 016 826.6 filed Dec. 23, 2015, the entire contents of each application are incorporated herein by reference.

FIELD OF THE INVENTION

The present invention pertains to a pump system (pump arrangement), particularly a pneumatic pump system, comprising at least one pump unit, a use of a pneumatic resistance as well as a medical device. The pump unit comprises a pump (pneumatic pump), as it can be used in a medical device.

BACKGROUND OF THE INVENTION

Currently commercially available pumps for gases in an output range of 0-110 mbar at 200-1,100 mL/min or 0-300 mbar at 200 mL/min can be adapted in their operating point by means of changes in the speed of rotation of the respective drive. An external pneumatic connection is necessary for a further adaptation in the particular application. Different pump heads must be mounted in special cases.

A change in the operating point of a pump by adapting the speed of rotation has the drawback that a so-called pulsation frequency as well as an alternating component in the resulting pressure curve are thereby changed. This leads undesirably to it not being possible to ensure avoiding defined sensor-critical frequencies. In addition, tuning of the pneumatic system, in which such a pump is operated, is made difficult. Finally, classical actions for suppressing the pulsation, for example, by means of a buffer volume acting as a low-pass filter, lose their effect if the adjusted speed of rotation exceeds the limit frequency of the functional unit functioning as a low-pass filter.

In addition, it should be borne in mind that increased speeds of rotation for the components of the respective pump represent a high mechanical load. In the case of comparatively high frequencies, for example, frequencies above 80 Hz in the present case, the losses increase tremendously due to valves no longer responding with low inertia and the phase position of the valve activity is shifted due to inertia of the valves at a later phase angle. The component of the so-called flexing action in the seal and/or the diaphragm increases drastically. In addition, the pumps are markedly louder.

In case of low frequencies, for example, frequencies below 10 Hz, a continuous pressure curve is no longer ensured. Each pump stroke can be detected as a single pressure pulse and correspondingly as a single pulse in the volume flow (flow pulse) as well. Damping or buffering by a volume requires very large volumes, which, however, additionally also distort the gas fronts in case of changing gas mixtures.

A change in the operating point of a pump by adapting the speed of rotation can, in addition, lead to an electric motor used as a drive being located within a critical operating area. This may lead to an intermittent angular velocity and to a high wear and tear of the brushes in the commutator in case of brush motors. Furthermore, this may lead to temperature peaks at the highly loaded windings of the electric motor, namely those windings, which are energized shortly before the load peak at the dead center of the pump. The moment of inertia of the rotor is not sufficient to guarantee a buffering of the load torque. Finally, a too low speed of rotation may also be problematic for a lubricating film to reliably form in the bearings.

In principle, usable linear pumps can be readily regulated, but are markedly inefficient because of their larger air gaps and require a higher output and generate higher temperatures. In addition, an equalization of the linearly moved masses requires complicated constructions, so that the pump arrangement and a device with such a pump arrangement run with minimal vibrations. So-called piezoelectric pumps are suitable only for miniature applications in terms of energy.

SUMMARY OF THE INVENTION

One object of the present invention is to indicate, based on the problems outlined above, a pump arrangement, which avoids the drawbacks described or at least reduces the consequences thereof.

This object is accomplished according to the present invention by means of a modular pump system. The modular pump system comprises a pump unit with a pump, for example, a piston pump or a diaphragm pump. The pump unit has at least two connections which are intended for connecting a hook-up unit. A hook-up unit from a plurality of different hook-up units can be connected to the pump unit by means of these connections. For that reason, each hook-up unit has pneumatic (compatible) connections, for example, standardized ISO cones or manufacturer-specific system connections corresponding to the connections of the pump. Such a hook-up unit can be connected either to at least one of the at least two connections or at least to both of the at least two connections of the pump unit. In case of a connection of the hook-up unit only to one of the at least two connections, the hook-up unit is connected to same in flow direction in series before or in series after the pump unit. In case of a connection to two of the at least two connections, the hook-up unit is connected parallel to the pump unit. When the pump unit has more than two connections and the hook-up unit likewise has more than two connections, a simultaneous or essentially simultaneous connection of such a plurality of connections may also be carried out during the connecting of the hook-up unit to the pump unit.

A central advantage of the solution according to the invention is that the operating point of the pump of the pump unit can be set by means of a hook-up unit that is associated with the pump unit such that, for example, too low or too high speeds of rotation otherwise occurring during the operation are thus avoided. A corresponding hook-up unit each is associated with the pump unit for this. Since at least one hook-up unit from a plurality of hook-up units can be connected to the pump unit because of the connections of the pump unit, on the one hand, and the connections of the hook-up units, on the other hand, it is possible to select a hook-up unit suitable for obtaining the respectively desired operating point of the pump of the pump unit. The pump system comprises the hook-up unit or a plurality of hook-up units in the form of a modular component. The advantage of such a modular system, in which the pump unit functions as a basis, to which individual modules, namely at least one hook-up unit, can be connected, is that each hook-up unit can be connected modularly to the pump unit, but may also be removed again or be replaced by a different hook-up unit there. The possibility of being able to replace one modular hook-up unit with another modular hook-up unit creates an adaptability to different conditions. An adaptation of the operating point or of another characteristic value of the pump comprised by the pump unit is carried out by means of such a hook-up unit. Because the hook-up unit is or becomes connected to the pump unit for this reason as well as in the interest of a better readability of the following description, an adaptation of the pump unit, especially an adaptation of the operating point of the pump unit shall be mentioned below only briefly from time to time. Based on this, furthermore—also in the interest of readability—the terms pump and pump unit are used synonymously such that the term pump unit always also covers the pump comprised thereby as well as that the term pump likewise covers the enclosing pump unit.

In another embodiment of a pump system of the type described here and below, provisions are made for the pump unit and/or the hook-up unit to have a filter element associated with each connection intended for connecting the hook-up unit to the pump unit. In this way, it is guaranteed that, for example, no contaminants find their way into the pump unit.

In a pump system of the type described herein, the hook-up unit functions advantageously as a resistance unit such that it represents, in the state connected to the pump unit, a pneumatic resistance for this pump unit. The operating point of the pump unit can be set in an especially easy and uncomplicated manner by means of a hook-up unit representing a pneumatic resistance. An alternative is that the hook-up unit functions as a buffer unit and represents, in the state connected to the pump unit, an additional volume for this pump unit and thus likewise a pneumatic resistance as a result. Such a pneumatic resistance leads to a change in the pneumatic operating point of the pump unit and, as a result, for example, higher speeds of rotation are needed to obtain the same vacuum as without the resistance. With a need of such higher speeds of rotation, for example, too low speeds of rotation are avoided.

In an embodiment of the modular pump system, the hook-up unit (resistance unit) functioning as pneumatic resistance comprises an adjustable shut-off body, especially a position adjustable shut-off body, adjustable in its position. Because of the adjustability of the shut-off body, the result is an adjustable resistance. This adjustability opens up the possibility of a simple and uncomplicated adaptation or setting of the operating point of the pump unit. The shut-off body can be automatically adjusted in a pressure-dependent manner in a special embodiment of such a resistance unit. An automatic adaptation of the operating point of the pump unit is obtained thereby. In an alternative embodiment, the shut-off body is adjustable by means of an actuator. The adaptation of the operating point of the pump unit can thus be easily carried out during the operation, for example, by means of a control unit provided for this, which brings about an actuation of the shut-off body by means of corresponding control signals and thus, for example, a change of a respective position of the shut-off body.

In another embodiment of a pump system of the type suggested here, an additional volume that can be coupled to the pump unit functions as resistance and as means for adjusting the operating point thereof. Such an additional volume changes the pneumatic conditions and a coupled additional volume also leads, for example, to a higher pump speed of rotation being necessary to obtain the same vacuum as without the additional volume. Too low speeds of rotation, for example, can be avoided with the need of such higher speeds of rotation.

In another embodiment of the modular pump system, the hook-up unit (resistance unit) functioning as pneumatic resistance comprises a settable additional volume or equalizing volume which can be coupled to the pump unit, for example, an additional volume which can be set by means of an adjustable piston. This settability also makes possible an adaptation of the operating point of the pump unit, especially an adaptation of the operating point during the current operation. In a special embodiment of a settable additional volume, the setting thereof is carried out by means of a pressure-dependent automatically adjustable piston. An automatic adaptation of the operating point is obtained thereby. In an alternative embodiment, the piston can be adjusted by means of an actuator. The adaptation of the operating point can thus be easily carried out during the operation, for example, by means of a control unit provided for this, which brings about an actuation of the shut-off body by means of corresponding control signals and thus, for example, a change of a respective position of the shut-off body.

In another embodiment of a pump system in question, a hook-up unit with at least one other pump functions as means for setting an operating point of the pump unit. The pump of the hook-up unit (other pump) is added to the pump of the pump unit comprised by the pump system anyway. The other pump operates with a phase shift to this pump during the operation. Similar to the coupling of a hook-up unit acting as additional volume, different pneumatic conditions and thus a possibility for adapting the operating point of the pump unit as well, namely by specifying a respective phase shift, are thereby obtained.

In a pump system with a pump unit as well as with at least one hook-up unit with at least one other pump, it is taken into consideration that the pump and the other pump act on a common volume, for example, by a first pump in a pump unit and a second pump in a hook-up unit being connected in parallel or in series. The at least one hook-up unit with the other pump then functions as means for setting an operating point of the pump unit. In another pump in the form of a piston pump, an additional volume for the pump unit and thus an additional pneumatic resistance for the pump unit can be predefined by means of a respective piston position (the same correspondingly applies to a diaphragm pump). A constant additional volume is obtained when the piston of the other pump is stationary. A variable additional volume is obtained in case of a movement of the piston. The additional volume and thus the respective pneumatic resistance can be dynamically adapted by a specification of the phase angle of a drive of the pump unit and of a drive of the pump of the at least one hook-up unit.

In yet another embodiment of a pump system in question, a hook-up unit or two hook-up units with an electroactive inlet valve and/or with an electroactive outlet valve functions or function as means for adjusting an operating point of the pump unit. In embodiments, an electroactive diaphragm functions as electroactive inlet valve or as electroactive outlet valve or an electroactive diaphragm as inlet valve or outlet valve, respectively. As an alternative, the electroactive inlet valve or outlet valve is configured in the form of a piezoelectric inlet valve or outlet valve.

All in all, the innovation suggested here is also the use of a hook-up unit which can be combined modularly with a pump unit for setting an operating point of the pump comprised by the pump unit, especially such a use of a hook-up unit in a pump system as described here and below. Finally, the innovation is also a medical device or a gas-measuring device with a pump unit or with a pump unit and at least one hook-up unit combined modularly with it as described here and below. Examples of such devices are a patient gas analyzer, especially a patient gas analyzer for use in intensive care or anesthesia, or a gas-measuring device for the area of safety monitoring, i.e., for example, a gas-measuring device for detecting gases that are toxic or critical to safety.

An exemplary embodiment of the present invention is explained in greater detail below based on the drawings. Subjects or elements corresponding to one another are provided with identical reference numbers in all figures.

The or each exemplary embodiment is not to be understood as a limitation of the present invention. Rather, variations and modifications are possible within the framework of the present disclosure, especially such variants and combinations, which are inferable by the person skilled in the art with respect to accomplishing the object, for example, by combining or varying individual features that are described in conjunction with the features that are described in the general or special section of the description as well as those contained in the claims and/or drawings and lead to a novel subject by means of combinable features. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematically simplified view of a pump as an example of a diaphragm pump;

FIG. 2 is a diagram of characteristics of a pump;

DESCRIPTION OF THE PREFERRED EMBODIMENTS

Figure 3:
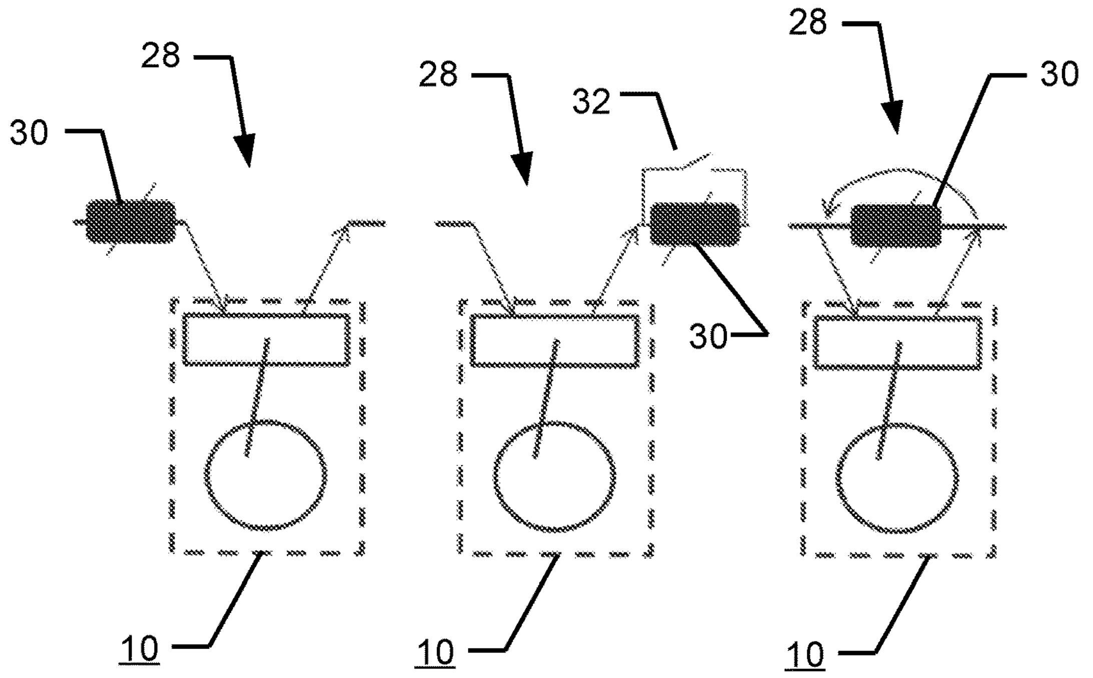
FIG. 3 is a schematic view of different variants of a pump arrangement with a pump and with a pneumatic resistance associated with the pump.

Referring to the drawings, the view in FIG. 1 shows in a schematically highly simplified manner a diaphragm pump, which is, in principle, known per se with a mechanical (crank) or motor (electric motor or the like) drive 12, as an example of a pump 10 of the type in question here. In the right-hand area of the view, a wall of a cylinder 14, a diaphragm 16, which is movable in relation to the cylinder 14 and functions as a piston with a seal 18 for the lateral sealing to the cylinder wall, inlets and outlets 20, 22 as well as inlet valves and outlet valves 24, 26 are shown in an enlarged manner in a detailed sketch. The following description applies to diaphragm pumps and piston pumps, so that the general term pump 10 is used below in summary. The inlets and outlets 20, 22 as well as the inlet valves and the outlet valves (nonreturn valves) 24, 26 are not shown in the figures below in each case, and in case they are shown, they are not designated in each case for the sake of clarity.

The view in FIG. 2 shows typical characteristics of a diaphragm pump 10 or of another pump 10 with various speeds of rotation n (n1, n2, n3, n4) plotted over the volume flow on the x axis and over the vacuum on the y axis. A constant pressure is obtained along the plotted horizontal line. A constant volume flow (flow) is obtained along the plotted vertical line. By means of an adaptation of the speed of rotation n of the corresponding pump 10, a constant or at least essentially constant volume flow or a constant or at least essentially constant pressure can accordingly also be obtained in case of a changing system resistance.

The view in FIG. 3 shows three variants of a pump arrangement 28, which comprises a pump 10 and at least one functional unit also designated below from time to time only briefly as resistance 30, which functions as pneumatic resistance 30 during the operation. The resistance 30 may be located on the input side of the pump 10 (left-hand view), on the output side of the pump 10 (central view) or between the input side and output side of the pump 10 (right-hand view).

In case of a resistance 30 associated with either the input side or the output side, this resistance 30 is arranged serially upstream of the pump 10 or arranged serially downstream of the pump in case of a flow direction arising during the operation. In case of a resistance 30 simultaneously associated with the input side and output side, this resistance 30 is connected parallel to the pump 10. In addition, it is shown in the central view that the resistance 30 can be entirely or partly deactivated by means of a bypass 32. This correspondingly applies to the embodiments shown on the left side and on the right side.

Such a continuously adjustable resistance 30, which can be connected in stages in series or in parallel, represents an especially simple possibility for adjusting an operating point of the respective pump 10. If the pneumatic load is too low during the operation and thus the speed of rotation is too low, a resistance 30 is used or activated, or in case of an already present resistance 30, the effective pneumatic resistance thereof is increased. The resistance 30 acts as a higher pneumatic load for the respective pump 10, and that output, which the pump 10 must additionally discharge for the resistance 30, is not available for the pneumatic system. Even if the degree of action deteriorates as a result, the pump 10 with the additional resistance 30 can operate in a speed of rotation range, for which it is configured (bearing, commutation). The action of such a resistance 30 is such that the pump 10 must overcome a higher pressure than is used for the pneumatic system in case of identical volume flow. A resulting additional drop in pressure at the resistance 30 shifts the characteristic of the pump 10 towards a lower pressure gain. This in turn may be equalized by a higher speed of rotation. As a result, the goal of compensating a too low drop in pressure of the pneumatic system, which leads to a too low speed of rotation, and being able to operate with a higher speed of rotation is achieved.

The mode of action is similar in the case of a parallel resistance 30 connected, as it were, via the pump (FIG. 3, right-hand view); however, the degree of action is less severely deteriorated than in case of a serial resistance 30. If the resistance 30 should become blocked during the operation, the pump 10 operates with maximum output, but at a low speed of rotation.

Figure 4:
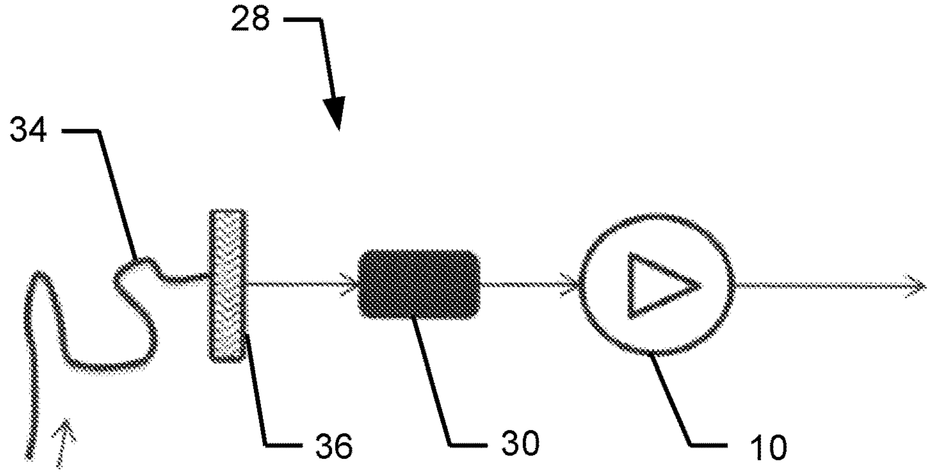
FIG. 4 is a schematic view of a pump assembly comprising a pump, a resistor and a filter also acting as a resistor.

A "connection" of a pump 10 to a resistance 30 functioning as pneumatic resistance, for example, a filter 36 (FIG. 4), according to the innovation suggested here, takes place on a modular basis such that a resistance 30 is introduced into a respective pneumatic system as needed, as this is shown schematically in a simplified manner in the view in FIG. 4. The views of the respective resistance 30 shown there and below symbolize, on the one hand, the resistance 30 itself, but also a module functioning as resistance 30 and combinable with a respective pump 10. Such modules can be replaced or mounted during installation or maintenance of the respective pneumatic system. The resulting static conditions in each case can be easily checked and utilized for diagnostic purposes.

The view in FIG. 4 shows a pump arrangement 28 with a pump 10 and with a resistance 30 which is associated with the pump 10 as well as with a tube, for example, a breathing tube 34, connected on the input side. In the pneumatic system, a resistance 30 is located upstream of the pump 10 and a filter 36 is located in connection with the breathing tube 34. The filter itself acts as pneumatic resistance in the pneumatic system as well. The resistance 30 may, for example, be mounted in the system by a connection line otherwise being provided between the filter 36 and the pump 10 being replaced by a connection line with the respective resistance 30. A line section with such a resistance 30 is a modularly mountable component, which can easily be replaced with another component (module), i.e., for example, a line section with a resistance 30 having a different pneumatic resistance or a line section without such a resistance 30. Because the filter itself acts as pneumatic resistance, such a module may also be configured in the form of a filter 36 with or without additional resistance 30.

For use of such modules, provisions are made for the pump 10 and the respective resistance 30 or the like each to be mounted in a special housing. The pump 10 and its housing are designated together as pump unit 110 and the resistance 30 or the like and the housing thereof are designated together as a resistance unit or generally as a hook-up unit 130. A pump unit 110 and at least one hook-up unit combined with it together form a pump system 120. A hook-up unit 130 can be combined with the pump unit 110 modularly. Because of this modular combinability, at least one hook-up unit 130 from a plurality of hook-up units 130 can each be combined with the pump unit 110 as needed.

Figure 5:
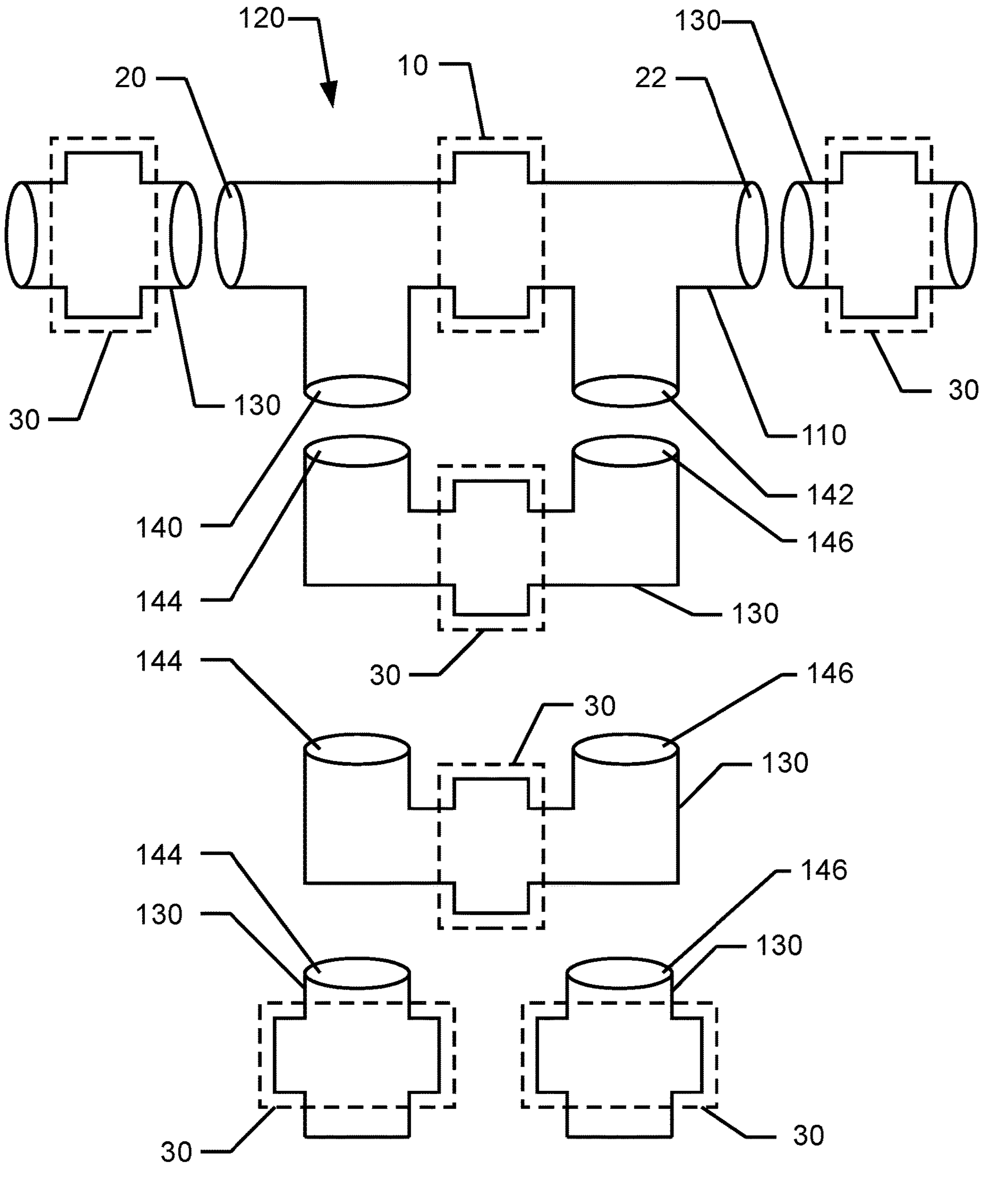
FIG. 5 is a schematic view of a pump system according to the invention.

This is schematically shown in a simplified manner in the view in FIG. 5. In the upper area of FIG. 5, a pump unit 110 is shown in the center. The pump 10 comprised thereby (piston pump, diaphragm pump or the like) is only shown symbolically. The thickened section shown in this respect is understood exclusively to be an illustration of a possible location of the pump 10 within the pump unit 110. Hook-up units 130 are shown to the right and to the left of the pump unit 110 (serial connection) as well as below the pump unit 110 (parallel connection). A resistance 30 or the like comprised thereby is only shown symbolically here as well, and the thickened section shown shall only make a possible location of such a resistance 30 or the like within the hook-up unit 130 distinguishable here as well. The hook-up units 130 shown in the lower half of the view shall illustrate that at least one hook-up unit 130 from a plurality of hook-up units 130 can be connected to the pump unit 110. The entirety of the hook-up units 130 available forms, to a certain extent, a modular system, from which a hook-up unit 130 corresponding to the respective application can be selected and is combined with the pump unit 110.

For such a combinability, the pump unit 110 and each hook-up unit 130 have connections 140, 142; 144, 146. The inlets and outlets 20, 22 may also be provided with corresponding connections or be configured in the form of the connections 140, 142, so that a hook-up unit 130 can—as shown—be connected to these as well. The connections 140, 142 on the sides of the pump unit 110 as well as the connections 144, 146 on the sides of the (each) hook-up unit 130 are configured such that they are combinable with one another, for example, in a locking manner and a connection that is tight for each medium delivered by the pump 10 of the pump unit 110 is established in case of a combination of two connections 140, 144; 142, 146. The configuration of the connections 140, 142; 144, 146 is, for example, like connections of a plug-in system such that, for example, the connections 140, 142 on the sides of the pump unit 110 are configured as sockets, in which correspondingly configured plug-like connections 144, 146 on the sides of the (each) hook-up unit 130 can be inserted and are accommodated there in a locking manner.

The further description is devoted to a variety of resistances 30 and the like which can each be made available in the form of such a hook-up unit 130. When only the respective resistance 30 itself is being described below, it should hence always also follow there that such a resistance 30 according to the innovation suggested here is integrated into a modular hook-up unit 130 combinable with a pump unit 110. This also applies if the respective view also shows, besides the respective resistance 30, the pump 10, with which the resistance 30 is combined, without also showing a pump unit 110 enclosing the pump 10 as well as a resistance unit 130 enclosing the resistance 30.

Figure 6:
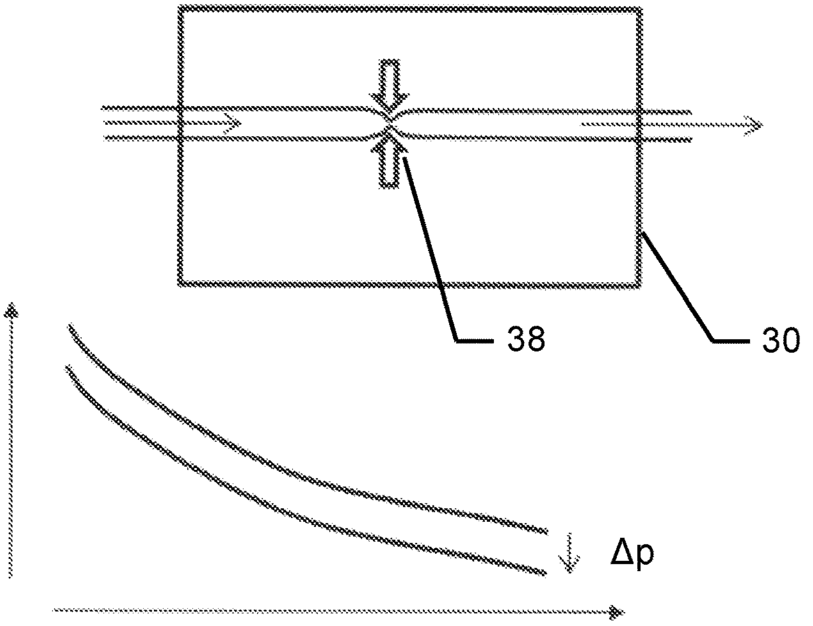
FIG. 6 is a schematic view of one of different embodiments of a resistance combinable with a pump and functioning there as pneumatic resistance, and also showing a resulting pressure change.

The view in FIG. 6 shows a fixed pneumatic resistance 30 in the form of a diaphragm-like geometry with a narrow gap and with a gap 38 resulting because of the narrow gap and remaining for the flow through the line section shown. The corresponding diagram shows the consequences of the resistance 30 functioning as series resistance in a pump system 120 according to FIG. 5 or generally in a pneumatic system, for example, a system as in FIG. 4, at a constant speed of rotation of the drive 12 of the pump 10 (n=const.) over the volume flow (x axis) and the vacuum (y axis). The resistance 30 leads to a drop in pressure Äp and, instead of the pump output illustrated in the diagram by the upper graph, an effective output, which is illustrated by the lower graph and is reduced by the drop in pressure Äp, results. Based on the family of characteristics shown in FIG. 2, it appears that the drop in pressure Äp and the reduced effective output can be compensated by an increase in the speed of rotation of the drive 12 of the pump 10.

Such a resistance 30 with a fixed pneumatic resistance 30 may also be provided in the form of a resistance 30 than can be adjusted once only. A corresponding hook-up unit 130 then comprises, for example, a tube or line section, which is crimped once only. As an alternative, an open-pore sponge or the like, for example, a filter medium, which is compressed to varying degrees in a housing having line connections on the input side and the output side, is also taken into account.

Figure 7:
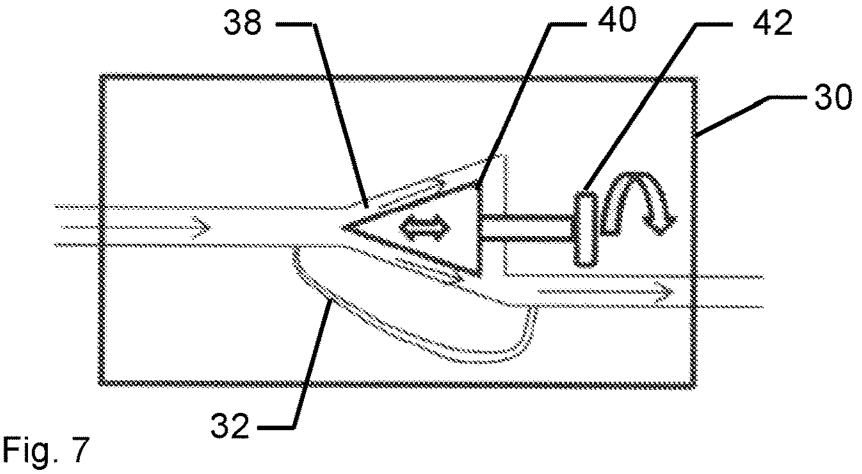
FIG. 7 is a schematic view of another of different embodiments of a resistance combinable with a pump and functioning there as pneumatic resistance.
Figure 8:
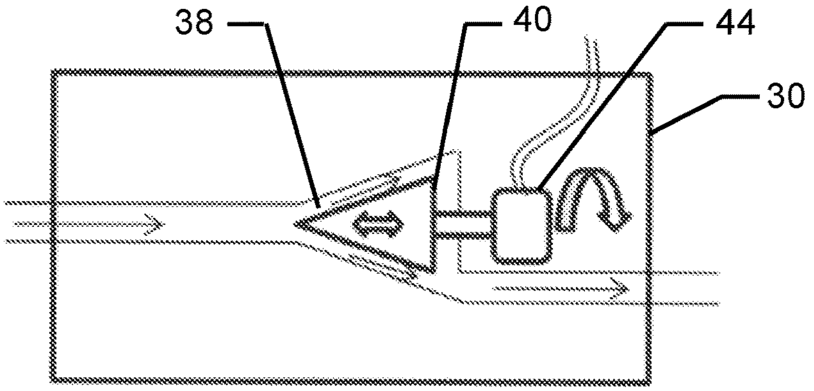
FIG. 8 is a schematic view of another of different embodiments of a resistance combinable with a pump and functioning there as pneumatic resistance.

By contrast to the fixed pneumatic resistance 30 according to FIG. 6, the views shown in FIG. 7 and FIG. 8 show possible embodiments of a variable pneumatic resistance 30. An opening width of the gap 38 available for the flow, which opening width is still invariable in the case of the fixed pneumatic resistance 30 according to FIG. 6, can now be set by means of a movable shut-off body 40. In the embodiments schematically shown in a simplified manner, the shut-off body 40 has a conical shape and is axially movably arranged in a likewise conically shaped line section. The movement of the shut-off body 40 and thus the setting of the opening width of the gap 38 can be carried out manually (by a manually actuatable handwheel 42 shown as an example in the view in FIG. 7) or by means of an automatically activatable actuator 44, for example, by means of an electric motor, especially by means of an electric motor in the form of a stepping motor, as this is shown in the view in FIG. 8. For such an automatically activatable actuator 44, it is true (for the other embodiments as well) that this actuator is adjustable corresponding to an operating action of a user, for example, by setting a rotary potentiometer or sliding potentiometer or by a simulation of such or similar operating elements by means of modern graphic user interfaces. In addition or as an alternative, such an actuator 44 may also be adjusted automatically by means of a control unit, for example, based on a control or regulation. The control unit processes a measured value of a control variable. For example, a speed of rotation of the pump 10, a pressure, a volume flow (flow), a pressure pulse, etc. come into consideration as control variables. In case of a control, the actuator 44 is set by means of the control unit corresponding to a characteristic or a function of the control variable. In case of a regulation, the actuator 44 is set by means of the control unit such that the respective control variable corresponds to a predefined or predefinable desired value. Dynamic desired values, i.e., desired values corresponding to a function, for example, a function over time, or desired values corresponding to a characteristic also come into consideration as desired values.

A bypass 32 connecting the line sections in front of and behind the shut-off body 40 is shown in the view in FIG. 7. Such a bypass 32 can, of course, also be provided in the case of a shut-off body 40 movable by means of a motor. An adaptation of the operating point achieved with a concretely set position of the shut-off body 40 is checked based on a consideration of the resulting electrical and/or mechanical characteristic of the respective pump 10.

Figure 9:
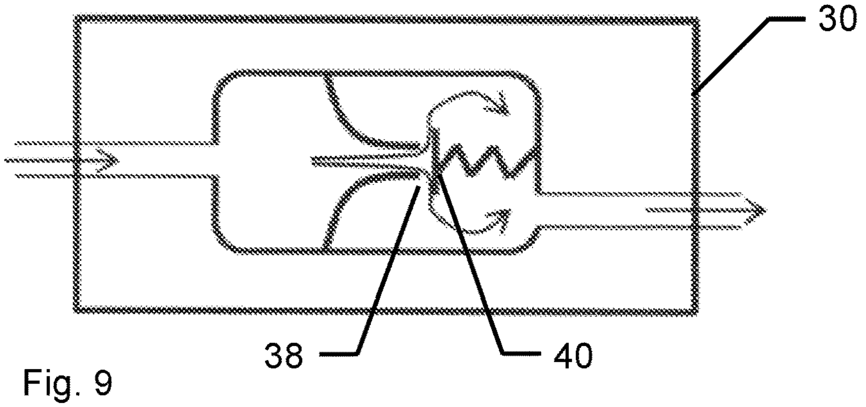
FIG. 9 is a schematic view of another of different embodiments of a resistance combinable with a pump and functioning there as pneumatic resistance.
Figure 10:
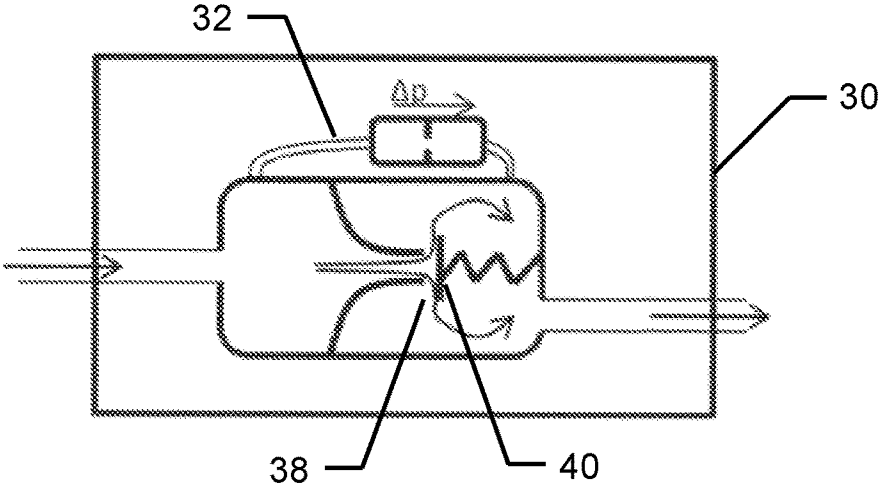
FIG. 10 is a schematic view of another of different embodiments of a resistance combinable with a pump and functioning there as pneumatic resistance.

The views in FIG. 9 and FIG. 10 show other possible embodiments of a variable pneumatic resistance 30. This pneumatic resistance 30 is configured such that it is independently adapted based on a correspondingly prevailing vacuum (suction operation). A movable shut-off body 40 in the form of a spring-mounted shut-off plate as well as a narrow space 38 opening towards the shut-off body 40 in a nozzle-like manner are provided for this in the embodiment shown. Because of the resilient mounting of the shut-off body 40, this shut-off body recedes proportionally to the correspondingly prevailing vacuum and releases the gap 38 for the flowing medium in a pressure-dependent manner. A back pressure of the pneumatic system is regulated such that the force of the vacuum generated during the operation corresponds to the force of the mechanical spring or of another spring element. The resulting gap 38 represents an additional pneumatic resistance in the overall system and for the respective pump. In case of low vacuums in the pneumatic system, i.e., low load and low pump speeds of rotation, the spring action is greater than the vacuum, so that the gap 38 is closed further and a higher pneumatic resistance is generated. The speed of rotation of the respective pump is increased for this and as a result, the gap 38 becomes larger again because of the resulting increased vacuum. The operating point of the pump 10 is in this way regulated to an approximately constant value depending on the load of the pneumatic system. The conditions explained above for the suction operation correspondingly apply in the pressure operation of the respective pump 10. When the drop in pressure rather than the prevailing vacuum is used for the counterpressure against the spring element in case of the flowthrough of the resistance 30, a regulation of the operating point may also be carried out according to the prevailing volume flow.

In such an embodiment of a variable resistance 30 according to FIG. 9 and FIG. 10, the pressure conditions themselves resulting during the operation are used to change the action of the resistance 30. Pneumatic systems can thus be achieved, which generate a variable drop in pressure, the so-called back pressure remaining approximately constant, however. This design, when sufficiently dampened, keeps the necessary pressure gain of a pump 10 constant. An optional bypass 32 is shown in the embodiment in FIG. 10.

Figure 11:
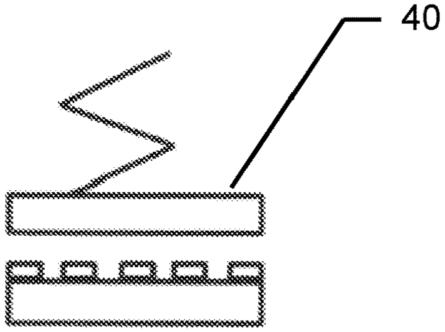
FIG. 11 is a schematic view of a movable shut-off body.

Setting of a maximum pneumatic resistance is structurally possible by means of an "untight" seating of the shut-off body 40, as this is schematically shown in a simplified manner in the view in FIG. 11. Because of a structured stop surface, the shut-off body 40 cannot close tightly, so that a flow correlated with the maximum pneumatic resistance is also possible in case of a shut-off body 40 in contact with the stop surface. Instead of the structured stop surface or in addition thereto, the surface of the shut-off body 40 may also be structured. The view in FIG. 11 is expressly only a schematically simplified view. In case of the conical shut-off body 40 according to the embodiment shown in FIG. 7 and FIG. 8, for example, a stop or a toothed ring in the surface of the shut-off body 40 or in the surface of the line section, against which the shut-off body 40 seals, come into consideration. Such a structuring, a stop or the like also prevents a blocking of the respective gap 38 or a sticking of the shut-off body 40.

Figure 12:
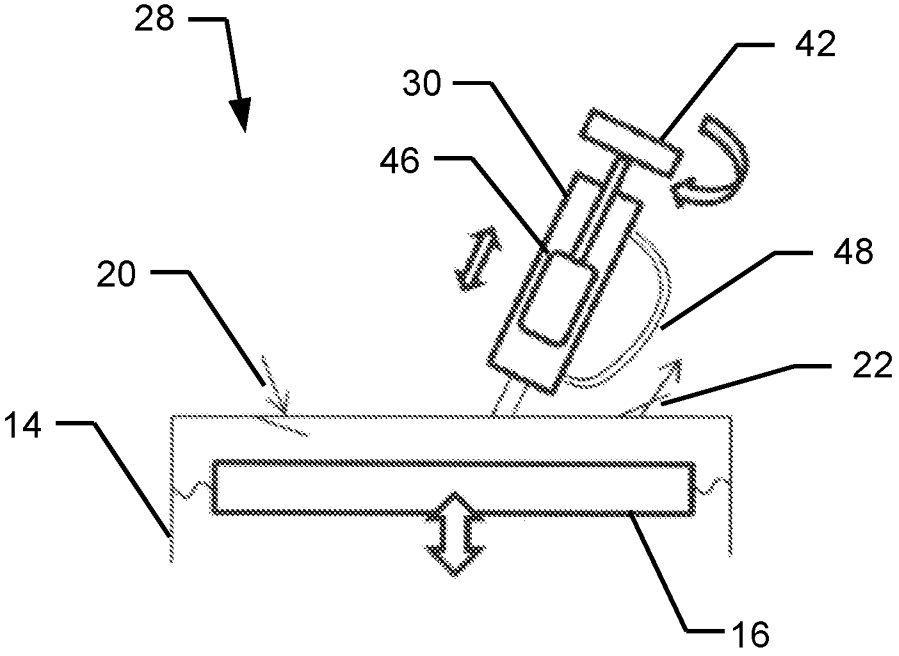
FIG. 12 is a schematic view of a pump arrangement with an embodiment of a resistance functioning as pneumatic resistance.
Figure 13:
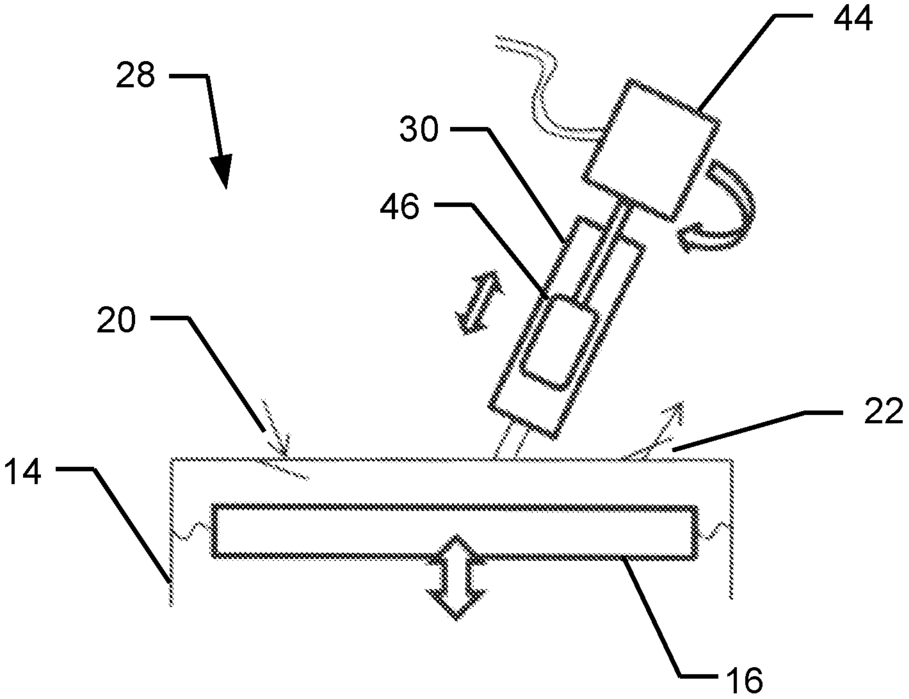
FIG. 13 is a schematic view of a pump arrangement with another embodiment of a resistance functioning as pneumatic resistance.

The views shown in FIG. 12 and FIG. 13 show a pump arrangement 28 with yet other possible embodiments of a variable pneumatic resistance 30. The resistance 30 shown there as an example, similar to an injector or a syringe, brings about a coupling of an additional volume that is variable by means of a movable piston 46 shown in the embodiment to the volume (dead volume) of the cylinder 14 of the respective pump 10. Depending on the position of the piston 46, a volume that is in addition to the unchanged dead volume of the pump 10, between a minimal additional volume up to, for example, five times the dead volume, can thus be coupled to the dead volume of the pump 10. In the view in FIG. 12, the variable additional volume can be set manually, for example—as shown—by means of a handwheel 42. In the view in FIG. 13, the variable additional volume can be set by means of an automatically activatable actuator 44, for example, by means of an electric motor, especially by means of an electric motor in the form of a stepping motor.

In the case of the use of an automatically activatable actuator 44 (especially embodiments according to FIG. 8 and FIG. 13), a measuring device, for example, a transducer, which is also adjustable by means of the actuator, and especially a transducer in the form of an incremental transducer, or a transducer for analyzing reference points at the shut-off body 40 or at the piston 46 is provided for detecting a respective position of the shut-off body 40 or of the piston 46 or of an indicator of the position thereof.

In case of an automatically activatable actuator 44 and/or a measuring device which is directly or indirectly associated with the actuator 44, additional connections, namely at least connections, by means of which a control signal for actuating the actuator 44 can be transmitted or is transmitted during the operation from the pump unit 110 to the hook-up unit 130 or a signal generated by the measuring device during the operation can be transmitted or is transmitted from the hook-up unit 130 to the pump unit 110, are provided on the sides of the pump unit 110 as well as of the hook-up unit 130 for integration into the pump system 120 (FIG. 5). A plug-socket system for establishing such connections comes into consideration here as well. Optionally, the electric feed of the actuator 44 and/or of the measuring device originating from the pump unit 110 is also carried out thereby. In such an embodiment, corresponding connections are also provided for this on the sides of the pump unit 110 as well as of the hook-up unit 130.

In addition, an equalization line 18, which connects a lower volume of the resistance 30 coupled to the cylinder 14 to a volume above the piston 46, is shown in the view in FIG. 12. Such an equalization line 48, especially an equalization line 48 in the form of a capillary equalization line 48, may equally be provided in case of the automatically settable resistance 30 (FIG. 13). The equalization line 48 prevents forces on the piston 46 because of too high pressure differences. The equalization line 48 is dimensioned such that pressure fluctuations, which form because of periodic movements of the diaphragm 16 (diaphragm pump) or a piston 16 (piston pump) of the respective pump 10, are not equalized. A limit frequency in this respect is, for example, 1 Hz at a minimal pump frequency of 10 Hz.

A use of variable pneumatic resistances 30, for example, variable resistances 30 as they are shown in FIGS. 6 through 9 as well as 12 and 13, leads to a regulation of the operating point of the respective pump 10, which now requires a smaller speed of rotation range for a greater pneumatic operating range.

Figure 14:
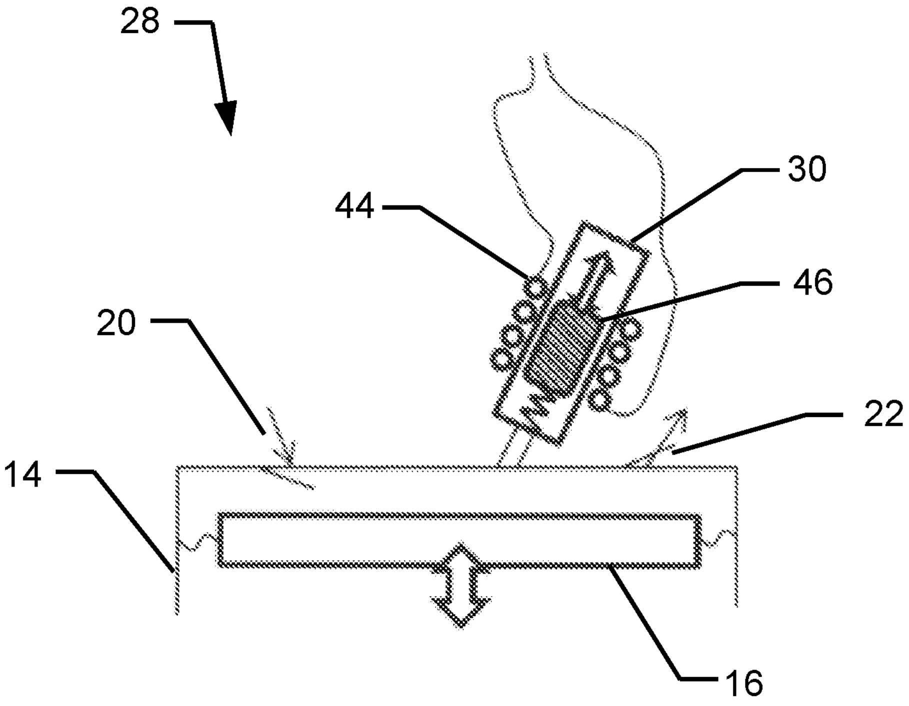
FIG. 14 is a schematic view of a pump arrangement with another embodiment of a resistance functioning as pneumatic resistance.

The embodiment of a pneumatic resistance 30, which is variable by coupling a variable additional volume shown in FIG. 14, essentially corresponds to the embodiment according to FIG. 13. A coil winding functions as actuator 44 here and the piston 46 is correspondingly produced from a ferromagnetic material. As is known, a magnetic field is produced in case of a flow of current through the coil winding. A position of the piston 46 and thus a volume coupled to the cylinder 14 of the pump 10 can be set by means of the resulting magnetic field. Optionally, the piston 46 is held by means of a spring, so that the movement of the piston 46 brought about electromagnetically is carried out against the spring pretension. However, the spring also makes possible a defined or at least essentially defined position of the piston 46 in case of a coil winding through which no current has flowed. To avoid an additional force due to the pressure differences, the volumes in front of or behind the piston 46 are optionally connected by means of an equalization line 48 (FIG. 12), so that a slow equalization of pressure can take place.

The position of the piston 46 and thus the size of the volume coupled to the cylinder 14 of the pump 10 can be automatically determined by means of a measurement of the inductance of the coil winding.

A variety of possibilities come into consideration for the automatic detection of an indicator of the volume coupled to the cylinder 14 by means of a corresponding measuring device: The use of an encoder, for example, of an encoder in the form of an incremental transducer; the use of a strain gauge strip, especially of a conductive elastomer functioning as a strain gauge strip, wherein such a conductive elastomer may also take over the function of the above-mentioned spring; the use of glass or magnetic scales; the use of photoelectric cells or sensors for detecting ultrasound durations or the like.

Figure 15:
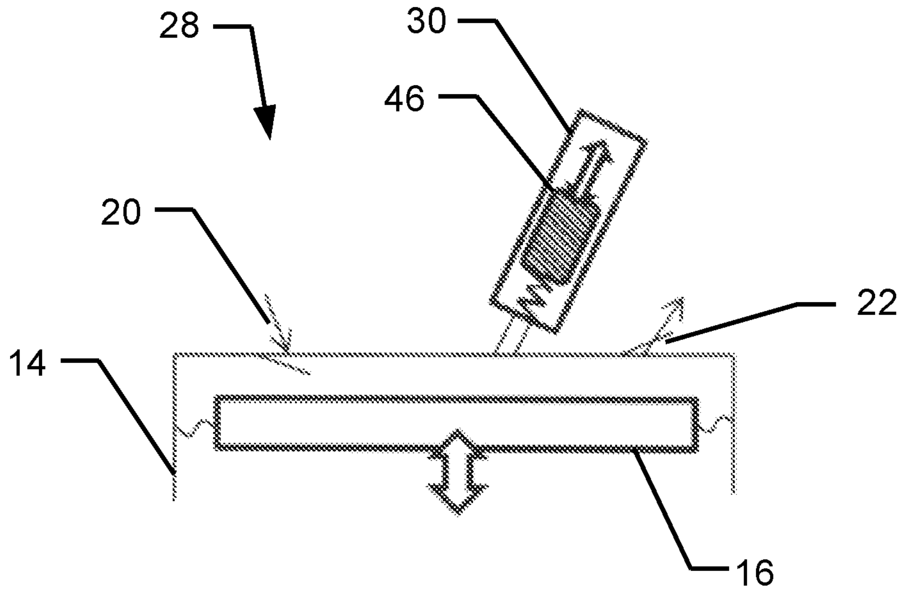
FIG. 15 is a schematic view of a pump arrangement with another embodiment of a resistance functioning as pneumatic resistance.
Figure 16:
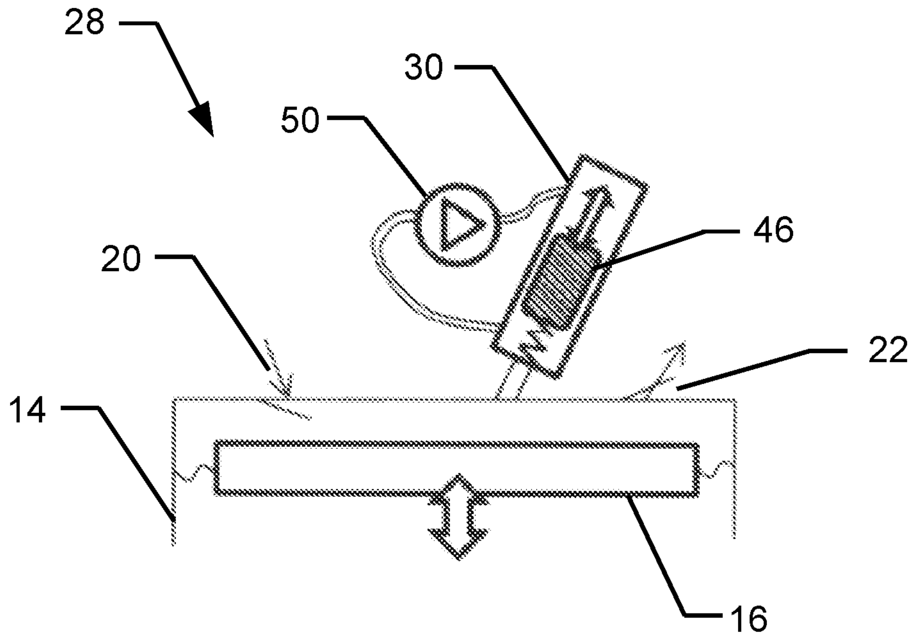
FIG. 16 is a schematic view of a pump arrangement with another embodiment of a resistance functioning as pneumatic resistance.

An embodiment of a pump arrangement 28 with a pneumatic resistance 30 in the form of a volume, which can be additionally coupled to the volume of the cylinder 14 of the pump 10, as shown in FIGS. 12 through 14, is shown with the views in FIG. 15 and FIG. 16. The special feature is that the adjustment of the piston 46 takes place independently because of the vacuum generated by the pump 10 during the operation (suction operation). For this, the piston 46 is mounted by means of a spring or another accumulator element and the movement of the piston 46 takes place against the spring action or the counteraction exerted by the accumulator element. In case of high vacuums, the piston 46 assumes a position which releases a comparatively small additional volume. As a result, the operating point of the respective pump 10 is shifted towards higher outputs. In case of low vacuums (low operating point of the pump 10), the piston 46 releases more additional volumes, so that a higher speed of rotation is required. In the embodiment according to FIG. 16, the vacuum generated by means of the pump 10 is supported by an auxiliary pump 50, for example, a piezoelectric pump. The position of the piston 46 is determined by a pressure difference of the volume in front of and behind the piston 46, which can be affected by means of the auxiliary pump 50. In this way, the additional volume to be set is determined not only by the structurally fixed ratio of forces between vacuum and spring tension. Rather, the additional volume and thus the resulting pneumatic resistance can also be set during the operation.

Figure 17:
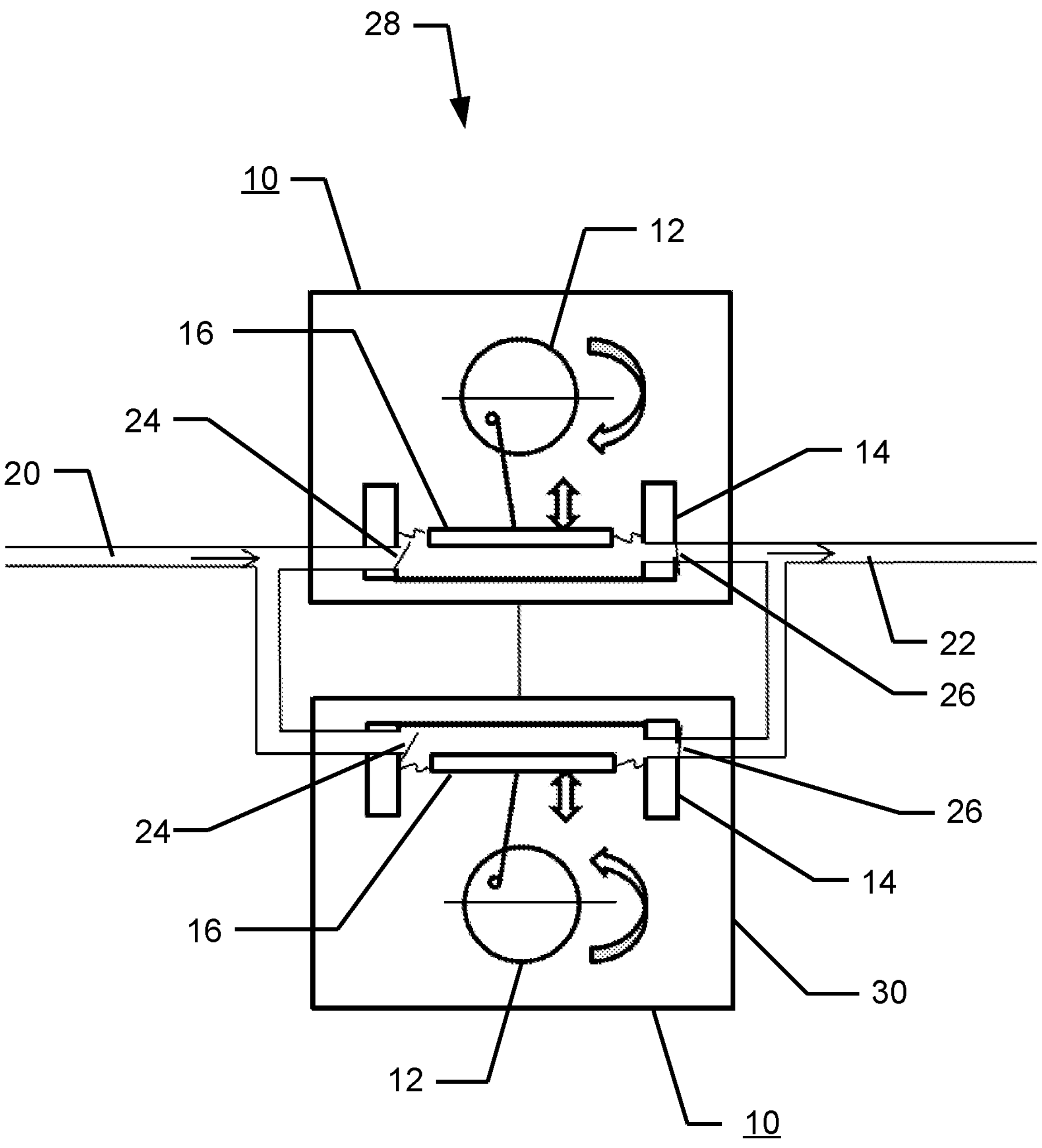
FIG. 17 is a schematic view of a pump arrangement with another pump as pneumatic resistance.

The view in FIG. 17 shows an embodiment of a pump arrangement 28 with a pump 10 in the form of a diaphragm pump and another pump 10, likewise in the form of a diaphragm pump, connected parallel thereto. However, it is not a question of whether the pumps 10 are configured as diaphragm or piston pumps. Hybrids, i.e., a combination of a diaphragm pump with a piston pump are possible as well. Both pumps 10 operate with their respective diaphragm 16/their respective piston 16 in their own chamber 14/their own cylinder 14 and a common volume, on which the two pumps 10 act by means of their diaphragm 16/their piston 16, is produced due to the parallel connection. When one of the pumps 10 is moved in an oscillating manner by means of the corresponding drive 12 and at the same time the other drive 12 is inactive, conditions as in the embodiments shown in FIG. 12 through FIG. 16 arise (the volume of the pump 10 with the inactive drive 12 forms an additional volume together with the line sections for the parallel connection). A variation of the additional volume is obtained in case of a simultaneous movement of both pumps 10. The resulting additional volume and thus the pneumatic resistance can be set by means of setting the phase angle between the movements of the two pumps 10. The pump 10 in the parallel connection thus functions as pneumatic resistance 30. Correspondingly, the pump 10 in the parallel connection is designated in the view in FIG. 17 both with the reference number 10 for a pump and with the reference number 30 for a pneumatic resistance.

Figure 18:
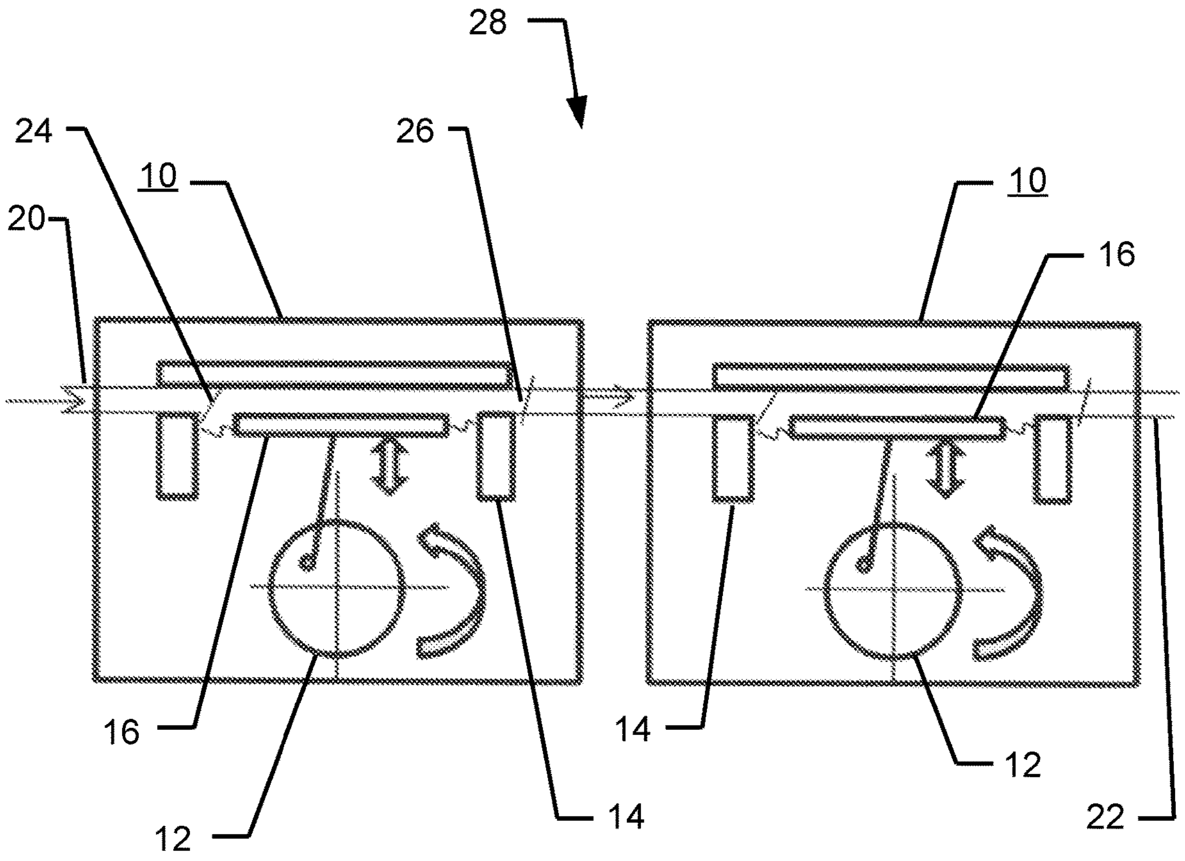
FIG. 18 is a schematic view of a pump arrangement with another pump as pneumatic resistance.

In the embodiment of a pump arrangement 28 shown in FIG. 18, two pumps 10 configured as diaphragm pumps are connected in series, i.e., in flow direction behind one another. Here as well, one of the two pumps 10 functions as additional volume and thus as pneumatic resistance 30 and at least one piston pump, instead of diaphragm pumps, comes into consideration here as well. In the pump system 120 (FIG. 5), one of the pumps 10 shown in FIG. 17 or FIG. 18 is the pump 10 of the pump unit 110 and the other pump 10 is a pump 10 in a hook-up unit 130 connected in series (or parallel) to the pump unit 110. Depending on a suction or pressure operation, the two pumps 10 can be shifted towards one another in phase position. In case of a serial connection, the pump output in case of synchronous operation is minimal. By contrast, an output maximum is obtained in case of a phase offset of 180°. Besides a different phase position, the two pumps 10 may have different dimensions, so that they are able to operate alone (for example, only the "large" pump or only the "small" pump) or against one another or with one another. A dynamic adaptation of the pneumatic resistance to the respective position of the pump 10 of the pump unit 110 can be achieved with at least two pumps 10 which can be driven independently of one another (one in a pump unit 110 and at least one other in at least one hook-up unit 130). In this case, for example, two pumps 10 run synchronously during a predefined or predefinable portion, for example, two thirds, of a full stroke and during a resulting remainder of the stroke, i.e., for example, during the last third, a phase shift is set by a corresponding actuation of the drive 12 of the other pump 10, which phase shift again disappears by the end of the full stroke.

Figure 19:
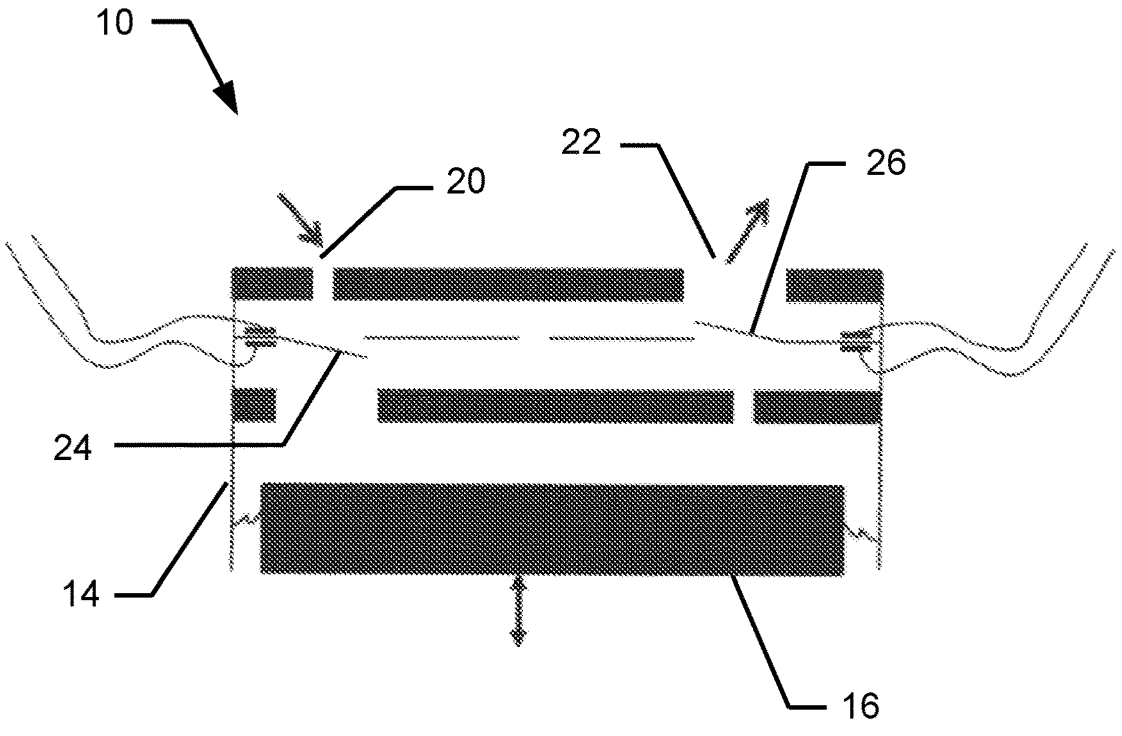
FIG. 19 is a schematic view of one of different embodiments of a resistance in the form of electroactive pump components combinable with a pump and functioning there as pneumatic resistance.

In the embodiment of a pump 10 shown in FIG. 19, a settable pneumatic resistance is achieved by means of a diaphragm that is electroactive and functions as an inlet valve 24 or as an outlet valve 26 or as an electroactive diaphragm functioning as an inlet valve 24 and one functioning as an outlet valve 26. Usually, the valves 24, 26 are composed of diaphragms that open and close due to the pressure and flow conditions. In the case of a diaphragm made of a material, the mechanical properties of the diaphragm, especially the strength or so-called elasticity modulus (E modulus) thereof, are variable, there is a possibility for changing the operating characteristic of the valves 24, 26. For example, the opening pressure may be increased or the opening can be entirely prevented. The closing can likewise be delayed and thus a slack within the respective pump 10 can be set.

When the E modulus of the or each diaphragm can be set by means of an applied electrical voltage, a pressure difference, which is higher compared to an unaffected diaphragm, is needed in case of a high E modulus for opening the diaphragm, i.e., for opening the inlet valve or outlet valve 24, 26. Only a small pressure difference is needed in case of a low E modulus. In this embodiment, the inlet valve 24 or the outlet valve 26 or the inlet vale 24 and the outlet valve 26 function as resistance 30. In a pump system 120 (FIG. 5), a corresponding hook-up unit 130 has either one such inlet valve 24 or only one such outlet valve 26 or one such inlet valve 24 and one such outlet valve 26. So-called electrically active polymers (EAP) are a suitable material for such a diaphragm. In addition, other electrically activatable materials, i.e., for example, piezoelectric materials, especially polyvinylidene fluoride (PVDF) or lead zirconate titanate (PZT) also come into consideration. The value actuation times are changed by the settable strength. For higher speeds of rotation of the respective pump 10, a softer constellation may be selected in order to shorten the absolute delay of the actuation. Likewise, the valve times and valve opening widths may be markedly delayed or reduced in case of lower output requirements, and thus the respective pump 10 can be brought to a reduced operating point, which in turn requires a higher speed of rotation.

Figure 20:
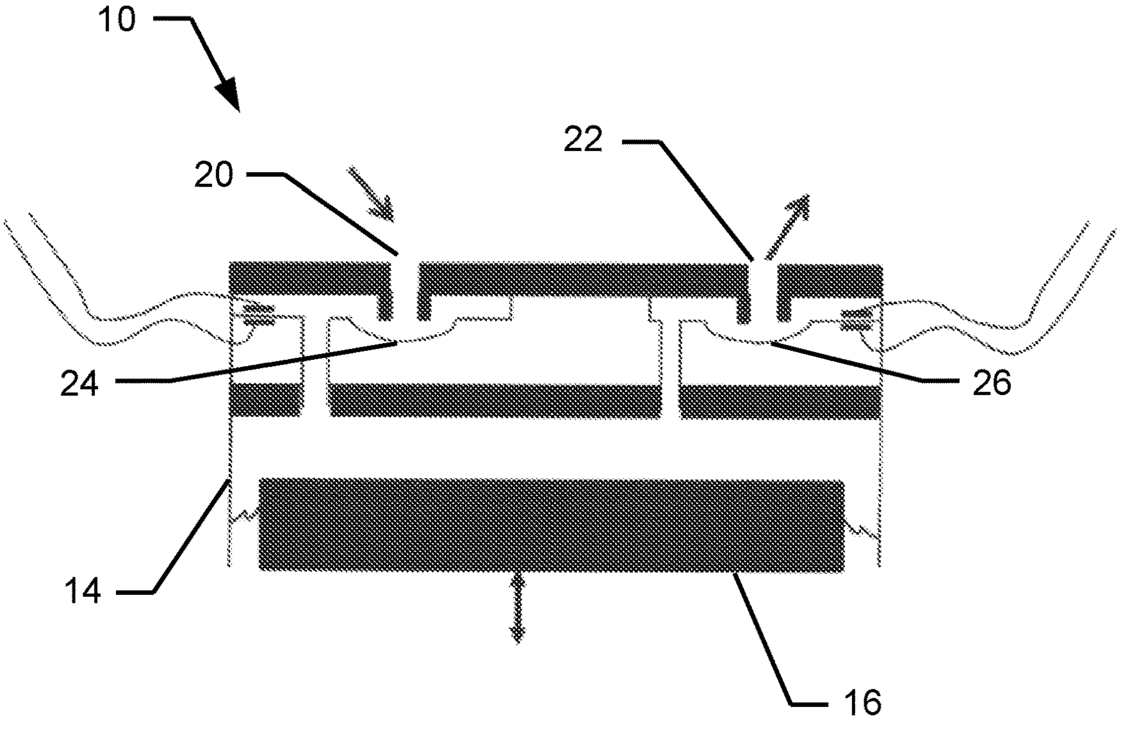
FIG. 20 is a schematic view of another of different embodiments of a resistance in the form of electroactive pump components combinable with a pump and functioning there as pneumatic resistance.

The view in FIG. 20 shows an embodiment similar to the embodiment shown in FIG. 19. Instead of the electroactive diaphragms according to FIG. 19, piezoelectric valves as the inlet or outlet valves 24, 26 are shown in the embodiment according to FIG. 20. These function—similar to electroactive diaphragms—as variable pneumatic resistances 30 and are accordingly comprised in a pump system 120 (FIG. 5) by a corresponding hook-up unit 130 with either such a piezoelectric valve or two piezoelectric valves.

Figure 21:
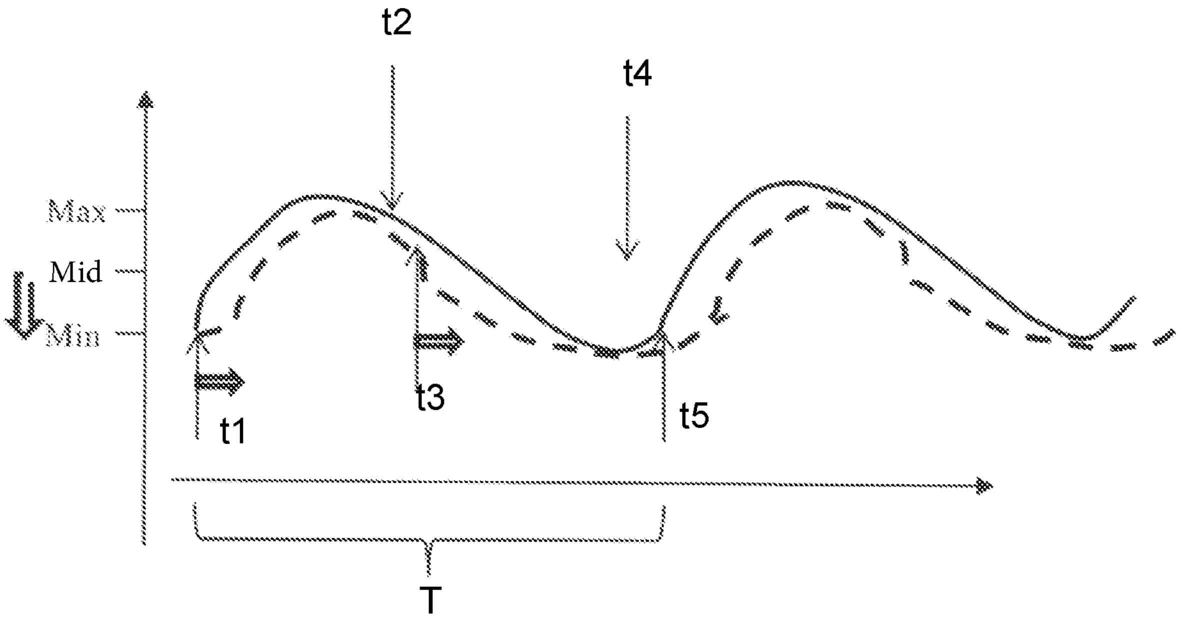
FIG. 21 is a characteristic for the illustration of the consequences of a use of electroactive components as resistance, as shown in FIGS. 19 and 20.

The view in FIG. 21 shows a typical characteristic of a pump 10 during pressure operation. The control times of the valves 24, 26 are plotted over the time/the piston position (x axis) and the overpressure achieved during the operation (y axis). The outlet valve 26 opens at a first time t1. The inlet valve 24 opens at a second time t2. The outlet valve 26 closes at a third time t3. The inlet valve 24 closes at a fourth time t4. A period (duration of period T) is ended with a reopening of the outlet valve 26 (time t5). The solid line graph corresponds to a pump characteristic with no effect on the valve times. The dotted line graph corresponds to a pump characteristic with changed valve times. The horizontal block arrows symbolize the times shifted for this during the opening and closing of the outlet valve 26. Because of the manipulated delayed actuation, the characteristic is shifted and the mean pressure drops (vertical block arrow next to the y axis). The reduced pressure requires a higher speed of rotation of the respective pump 10 for the same operating point.

Finally, individual essential aspects of the description presented here can be briefly summarized as follows: A pump arrangement 28 with a pump (pneumatic pump) 10 and a means for setting an operating point of the pump 10 are suggested, wherein a pneumatic resistance 30 associated with the pump 10 functions as the means for setting an operating point of the pump 10, the use of a pneumatic resistance 30 for setting an operating point of a respective pump 10 and finally a medical device with such a pump arrangement 28. The description mentions a plurality of possible embodiments of such a resistance 30. All the different forms of resistance are, in principle, combinable with one another. Especially insofar as a resistance 30 in the form of a modular component (hook-up unit 130) can be associated with the pump 10 comprised by a pump unit 110 as means for setting the operating point thereof, different forms of resistance are combinable by individual hook-up units 130 being connected in series or parallel.

The core of the innovation suggested here is first and foremost a pump system 120 with a central pump unit 110, with which at least one hook-up unit 130 from a group containing a plurality of hook-up units 130 can be combined in modular form for setting an operating point of a pump 10 comprised by the pump unit 110, then use of such a hook-up unit 130 in a pump system 120 for setting the operating point of the pump unit 110 thereof and finally a medical device with such a pump unit 110 or with such a pump unit 110 and at least one hook-up unit 130 combined with it.

While specific embodiments of the invention have been shown and described in detail to illustrate the application of the principles of the invention, it will be understood that the invention may be embodied otherwise without departing from such principles.

LIST OF REFERENCE NUMBERS

10 Pump
12 Drive
14 Cylinder
16 Diaphragm/Piston
18 Seal
20 Inlet
22 Outlet
24 Valve, inlet valve
26 Valve, outlet valve
28 Pump arrangement
30 (Pneumatic) resistance
32 Bypass
34 Breathing tube
36 Filter
38 Narrow space/Gap
40 Shut-off body
42 Handwheel
44 Actuator (e.g., electric motor)
46 Piston
48 Equalization line
50 Auxiliary pump
110 Pump unit
120 Pump system
130 Hook-up unit
140-142 Connection
144-146 Connection

What is claimed is:

1. A device, comprising:

a gas measurement device for use in medical gas measurements and/or process gas measurement applications, the gas measurement device comprising a modular pump system and a gas flow path, the modular pump system comprising:

a single pump unit comprising a single pump unit housing and a pump arranged in the single pump unit housing, the single pump unit housing having a pump unit first end, a pump unit second end and at least two connections located between the pump unit first end and the pump unit second end, the pump unit first end defining one of a pump unit fluid inlet opening and a pump unit fluid outlet opening, the pump unit second end defining another one of the pump unit fluid inlet opening and the pump unit fluid outlet opening, the pump being configured to deliver fluid to the pump unit fluid outlet opening in a fluid exiting direction, the at least two connections being located between the pump unit fluid inlet and the pump unit fluid outlet, wherein a portion of the pump unit housing extends continuously, without interruption, from one of the at least two connections to another one of the at least two connections, the pump unit housing comprising a longitudinal axis, the pump unit housing portion extending in an axial direction with respect to the longitudinal axis, the pump unit fluid inlet opening being axially opposite the pump unit fluid outlet opening with respect to the longitudinal axis; and a plurality of different hook-up units, each of which is connectable to the pump unit and wherein at least one of the hook-up units has hook-up unit connections corresponding to the at least two connections of the pump unit, the at least one of the hook-up units defining a flow path for passing fluid from an inlet side of the pump to an outlet side of the pump, the pump unit being in fluid communication with the at least one of the hook-up units via at least one of the hook-up unit connections of the at least one of the hook-up units and at least one of the at least two connections of the pump unit, the at least one of the hook-up unit connections of the at least one of the hook-up units and the at least one of the at least two connections of the pump unit defining at least a portion of the gas flow path, the hook-up unit connections comprising a hook-up unit fluid inlet and a hook-up unit fluid outlet, the at least two connections comprising a connection inlet and a connection outlet, the connection outlet being located adjacent to the hook-up unit fluid inlet, the connection inlet being located adjacent to the hook-up unit outlet, the connection inlet being configured to receive fluid from the at least one of the hook-up units at a location downstream of the outlet side of the pump with respect to the fluid exiting direction.

2. A device in accordance with claim 1, wherein the pump unit or the at least one of the hook-up units or both the pump unit and the at least one of the hook-up units has a filter element associated with the one of the at least two connections, each of the at least two connections of the pump unit comprising a socket, each of the hook-up unit connections of the at least one of the hook-up units comprising a plug connection, the plug connection being inserted in the socket, the pump unit fluid inlet opening being configured for gas entering the single pump unit in a longitudinal direction of the single pump unit, the pump unit fluid outlet opening being configured for the gas exiting the single pump unit in the longitudinal direction of the single pump unit.

3. A device in accordance with claim 1, wherein the at least one of the hook-up units forms a resistance unit and presents, in a connected state with the pump unit, a pneumatic resistance for the pump unit.

4. A device in accordance with claim 1, wherein the at least one of the hook-up units forms a buffer unit and presents, in a connected state with the pump unit, an additional volume for this pump unit.

5. A device in accordance with claim 1, wherein at least one of the hook-up units forms one of a resistance unit and a buffer unit, the one of the resistance and the buffer unit comprising a means for adjusting a resistance of the one of the resistance unit and the buffer unit.

6. A device in accordance with claim 5, wherein the means for adjusting comprises a pressure-dependent, automatically adjustable shut-off body.

7. A device in accordance with claim 5, wherein the means for adjusting comprises an adjustable shut-off body, the at least one of the hook-up units further comprising an actuator wherein the shut-off body is adjustable by the actuator.

8. A device in accordance with claim 4, wherein the buffer unit comprises an adjustable piston to provide an additional volume settable by the adjustable piston.

9. A device in accordance with claim 8, wherein the adjustable piston is a pressure-dependent, automatically adjustable piston.

10. A device in accordance with claim 8, wherein the buffer unit further comprises an actuator adjusting the adjustable piston or an additional pump adjusting the adjustable piston.

11. A device in accordance with claim 3, further comprising an additional pump operated with a phase shift to the pump unit.

12. A device in accordance with claim 4, further comprising an additional pump operated with a phase shift to the pump unit.

13. A device in accordance with claim 1, further comprising an electroactive inlet valve or an electroactive outlet valve or both an electroactive inlet valve and an electroactive outlet valve functioning as a pneumatic resistance, wherein:

the at least one of the hook-up units forms a resistance unit and presents, in a connected state with the pump unit, a pneumatic resistance for the pump unit; or the at least one of the hook-up units forms a buffer unit and presents, in a connected state with the pump unit, an additional volume for this pump unit.

14. A device in accordance with claim 13, the electroactive inlet valve or outlet valve or both the inlet valve and outlet valve comprises an electroactive diaphragm.

15. A device in accordance with claim 13, the electroactive inlet valve or outlet valve or both the inlet valve and outlet valve comprises a piezoelectric valve.

16. A method comprising:

providing a gas measurement device for use in medical gas measurements and/or process gas measurement applications, the gas measurement device comprising a gas flow path and a single pump unit and a plurality of different hook-up units, each of which is connectable to the single pump unit, the single pump unit comprising a single pump unit housing and a pump arranged in the single pump unit housing, the pump unit housing comprising at least two pump unit connections, wherein at least one of the hook-up units has hook-up unit connections corresponding to the at least two pump unit connections, the pump unit housing comprising a first pump unit end and a second pump unit end, the first pump unit end comprising a pump unit fluid inlet opening, the second pump unit end comprising a pump unit fluid outlet opening, the pump being configured to deliver fluid to the pump unit fluid outlet opening in a fluid exiting direction, the pump unit fluid inlet opening being axially opposite the pump unit fluid outlet opening with respect to a longitudinal axis of the pump unit housing, wherein the at least two pump unit connections are located between the pump unit fluid inlet and the pump unit fluid outlet, the pump unit housing comprising a pump unit housing portion extending continuously, without interruption, from at least one of the two pump unit connections to another one of the at least two pump unit connections, the gas flow path being defined by at least one of the hook-up unit connections of the at least one of the hook-up units and at least one of the at least two pump unit connections;

connecting the at least one of the hook-up units to at least one of the at least two pump unit connections to set an operating point of the pump unit, the at least one of the hook-up units being in fluid communication with the pump unit via at least the at least one of the at least two pump unit connections and the one of the hook-up unit connections of the at least one of the hook-up units, wherein the least one of the hook-up units is configured to deliver fluid to the single pump unit housing at a position located downstream of an outlet side of the pump with respect to the fluid exiting direction.

17. A method in accordance with claim 16, further comprising providing the at least one of the hook-up units as a pneumatic resistance for the pump unit, the at least one of the hook-up unit connections defining a hook-up unit connection inlet, the at least two pump unit connections comprising a pump connection inlet and a pump connection outlet, the pump connection outlet being located adjacent to the hook-up unit connection inlet, the pump unit housing portion extending parallel to the longitudinal axis.

18. A method in accordance with claim 16, further comprising providing the at least one of the hook-up units as a buffer volume unit providing an additional volume for the pump unit, wherein the single pump unit housing is configured to receive the fluid in a fluid receiving direction via the pump unit fluid inlet opening and the single pump unit housing is configured to deliver the gas in the gas exiting direction via the pump unit fluid outlet opening, wherein the gas receiving direction and the gas exiting direction are parallel to a direction of the longitudinal axis of the pump unit housing, each of the at least two pump unit connections comprising a socket, each of the hook-up unit connections comprising a plug connection, the plug connection being inserted in the socket.

19. A medical device comprising:

a gas measurement device for use in medical gas measurements and/or process gas measurement applications, the gas measurement device comprising a gas flow path, the gas measurement device comprising:

a single pump unit comprising a single pump unit housing and a pump arranged in the single pump unit housing, the pump unit housing comprising at least two connections located between one end of the pump unit housing and another end of the pump unit housing, the one end of the pump unit housing comprising a pump unit fluid inlet opening, the another end of the pump unit housing comprising a pump unit fluid outlet opening, the pump being configured to deliver fluid to the pump unit fluid outlet opening in a fluid exiting direction, the pump unit fluid inlet opening being axially opposite the pump unit fluid outlet opening with respect to a longitudinal axis of the single pump unit housing, the at least two connections being located between the pump unit fluid inlet and the pump unit fluid outlet, the pump unit housing comprising a pump unit housing portion extending continuously, without interruption, from one of the at least two connections to another one of the at least two connections; and a plurality of different hook-up units, each of which is connectable to the pump unit, wherein at least one of the hook-up units is connected directly to at least one of the at least two connections to set a pneumatic operating point of the pump unit, the at least one of the hook-up units being in fluid communication with the pump unit via at least one of a plurality of hook-up unit connections of the at least one of the hook-up units and the at least one of the at least two connections of the pump unit, the at least one of the hook-up unit connections of the at least one of the hook-up units and the at least one of the at least two connections of the pump unit defining at least a portion of the gas flow path, wherein the at least one of the hook-up units being configured to deliver the fluid from a position located on an inlet side of the pump to the single pump unit housing at a position located downstream of an outlet side of the pump with respect to the fluid exiting direction.

20. A medical device in accordance with claim 19, wherein the single pump unit housing is configured to receive the fluid in an axial direction of the single pump unit housing relative to the longitudinal axis of the single pump unit housing via the pump unit fluid inlet and the single pump unit housing is configured to guide the fluid such that the fluid exits the single pump unit housing via the pump unit fluid outlet opening in the longitudinal direction of the single pump unit housing, wherein the at least one of the hook-up unit connections defines a hook-up unit connection inlet, the at least two connections of the pump unit comprising a pump connection inlet and a pump connection outlet, the pump connection outlet being located adjacent to the hook-up unit connection inlet, the pump unit housing portion extending in an axial direction with respect to the longitudinal axis, wherein:

the at least one of the hook-up units forms a resistance unit and presents, in a connected state with the pump unit, a pneumatic resistance for the pump unit; or the at least one of the hook-up units forms a buffer unit and presents, in a connected state with the pump unit, an additional volume for this pump unit.

* * * * *